United States Patent
Yin et al.

(10) Patent No.: US 10,007,738 B2
(45) Date of Patent: Jun. 26, 2018

(54) METHOD FOR FORMING WEBPAGE, PERIPHERAL APPARATUS AND SYSTEM

(71) Applicant: ZHUHAI PANTUM ELECTRONICS CO., LTD., Zhuhai (CN)

(72) Inventors: Aiguo Yin, Zhuhai (CN); Xuan Tan, Zhuhai (CN); Zhonghua Lan, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 63 days.

(21) Appl. No.: 14/738,760

(22) Filed: Jun. 12, 2015

(65) Prior Publication Data
US 2015/0278236 A1 Oct. 1, 2015

Related U.S. Application Data

(63) Continuation of application No. PCT/CN2013/085393, filed on Oct. 17, 2013.

(30) Foreign Application Priority Data

Dec. 13, 2012 (CN) .......................... 2012 1 0539587

(51) Int. Cl.
*G06F 17/00* (2006.01)
*G06F 17/30* (2006.01)
*H04L 29/08* (2006.01)

(52) U.S. Cl.
CPC .... *G06F 17/3089* (2013.01); *G06F 17/30899* (2013.01); *G06F 17/30905* (2013.01); *H04L 67/02* (2013.01)

(58) Field of Classification Search
None
See application file for complete search history.

(56) References Cited

U.S. PATENT DOCUMENTS 6,623,529 B1 * 9/2003 Lakritz ............... G06F 17/2288
707/E17.109
6,687,736 B1 * 2/2004 Lee ....................... G06F 9/4448
704/8

(Continued)

FOREIGN PATENT DOCUMENTS

CN 1423213 A 6/2003
CN 1448866 A 10/2003

(Continued)

OTHER PUBLICATIONS

The Japanese Examination Report of corresponding Japnese patent application No. 2015-546820, dated Sep. 13, 2016.

(Continued)

*Primary Examiner* — Howard Cortes
(74) *Attorney, Agent, or Firm* — Anova Law Group, PLLC

(57) ABSTRACT

The present invention provides a method for forming a webpage, a peripheral apparatus, and a system. The method includes: when a webpage forming request sent by a client is received, acquiring, from the client, language information for forming a webpage; and sending webpage data to the client according to the language information and a preset webpage description file, so that the client displays, on the client according to the webpage data, a webpage formed by adopting the language information. According to the webpage forming method, peripheral apparatus, and system in these embodiments, after receiving a webpage forming request from a client, the peripheral apparatus acquires language information for forming a webpage form the client, and sends webpage data to the client according to the language information, so that a language adopted for a webpage displayed by the client meets a user's habits, thereby facilitating the user.

9 Claims, 5 Drawing Sheets

(56) References Cited

U.S. PATENT DOCUMENTS

| | | | |
|---|---|---|---|
| 8,230,328 B2* | 7/2012 | Yamamura | G06F 21/41 358/1.13 |
| 8,843,360 B1* | 9/2014 | Johnston | G06F 9/4448 704/1 |
| 2005/0251562 A1* | 11/2005 | Hauduc | G06F 17/30905 709/217 |
| 2007/0061129 A1* | 3/2007 | Barreiro | G06F 17/289 704/9 |
| 2008/0301277 A1* | 12/2008 | Tsujiguchi | G03G 15/5075 709/223 |
| 2010/0286977 A1* | 11/2010 | Chin | G06F 17/289 704/4 |
| 2012/0036265 A1* | 2/2012 | Meyler | G06F 17/3087 709/226 |

FOREIGN PATENT DOCUMENTS

| | | |
|---|---|---|
| CN | 1185593 C | 1/2005 |
| CN | 101714086 A | 5/2010 |
| CN | 101807209 A | 8/2010 |
| CN | 101452375 B | 5/2012 |
| CN | 101957846 B | 7/2012 |
| CN | 103034720 A | 4/2013 |
| JP | 10-171810 A | 6/1998 |
| JP | 2002-108749 A | 4/2002 |
| JP | 2003-296223 A | 10/2003 |
| JP | 2006-119706 A | 5/2006 |
| JP | 2008-90790 A | 4/2008 |
| JP | 2012-181634 A | 9/2012 |

OTHER PUBLICATIONS

WOLFIT Web page, http://www.wilf.cn/post/redirect-multi-language-pages.html, Apr. 8, 2010.

Chinese Second Examination Report of corresponding China patent application No. 201210539587.4, dated Dec. 10, 2015.

International Search Report of corresponding International PCT Application No. PCT/CN2013/085393, dated Jan. 30, 2014.

Chinese First Examination Report of corresponding China Application No. 201210539587.4, dated Mar. 25, 2015.

\* cited by examiner

METHOD FOR FORMING WEBPAGE, PERIPHERAL APPARATUS AND SYSTEM

CROSS-REFERENCE TO RELATED APPLICATIONS

This application is a continuation of International Application No. PCT/CN2013/085393, filed on Oct. 17, 2013, which claims priority to Chinese Patent Application No. 201210539587.4, filed on Dec. 13, 2012, both of which are hereby incorporated by reference in their entireties.

TECHNICAL FIELD

The present invention relates to the field of image forming technologies and, in particular, to a method for forming a webpage, a peripheral apparatus and a system.

BACKGROUND

In the prior art, there are lots of peripheral apparatuses with network server function, such as printer, multi-function copier, fax machine and scanner and the like. Based on the network server function, when a user types in the website of the peripheral apparatus through the browser of the client, the peripheral apparatus generates webpage data and sends it to the client, the client can display the webpage on the browser according to the webpage data, users can browse or set parameter, log and other information of the peripheral apparatus through the webpage.

In order to enable a peripheral apparatus to be used in different countries or regions, the webpage provided by the same peripheral apparatus usually contains multiple languages, such as English, Chinese, Japanese and Korean and so on. The webpages of the peripheral apparatus in the prior art are all displayed on the browser of the client with a constant default language, users can switch language through a displaying language bar on the webpage to meet the requirements of users.

However, the users would spend a long time to switch the languages one by one, when the users are not familiar with the default displaying language of the webpage, which may even cause that the users cannot find the language switch bar, thereby bringing great inconveniences to the users.

SUMMARY

The present invention provides a method for forming a webpage, a peripheral apparatus, and a system to overcome the defect in the prior art that it would spend the user a long time to switch language one by one, when the user is not familiar with the default displaying language of the webpage.

A first aspect of the present invention provides a method for forming a webpage, including:

when a webpage forming request sent by a client is received, acquiring, from the client, language information for forming a webpage; generating a language file according to the language information and sending the language file to the client, the client generates webpage data based on the language file and a preset webpage description file, or sending webpage data to the client according to the language information and a preset webpage description file, so that the client displays, on the client according to the webpage data, a webpage formed by adopting the language information.

The sending webpage data to the client according to the language information and a preset webpage description file, so that the client displays, on the client according to the webpage data, a webpage formed by adopting the language information, includes: generating a language file according to the language information; generating webpage data according to the language information and the preset webpage description file, so that the client displays directly, on the client according to the webpage data, a webpage formed by adopting the language information.

The sending webpage data to the client according to the language information and a preset webpage description file, so that the client displays, on the client according to the webpage data, a webpage formed by adopting the language information, includes: generating the language file according to the language information, sending the language file and the preset webpage description file to the client, so that the client displays, on the client combining the webpage description file and the language file, a webpage formed by adopting the language information.

Before acquiring, from the client, language information for forming a webpage, the method further includes: judging whether the language information for forming a webpage can be acquired from the client, when a judging result is no, adopting default language information as the language information for forming a webpage, when a judging result is yes, executing the operation of acquiring, from the client, language information for forming a webpage.

The acquiring, from the client, language information for forming a webpage includes: sending a preset executable file for acquiring language information to the client, so that the client executes the executable file to acquire the language information from the client, or sending an acquiring request for acquiring language information to the client, so that the client acquires the language information from the client according to the acquiring request; receiving the language information returned from the client.

Before acquiring, from the client, language information for forming a webpage, the method further includes:

sending the webpage description file to the client;

the acquiring, from the client language, information for forming a webpage including:

sending a preset executable file for acquiring language information to the client, so that the client invokes the executable file to acquire language the information for forming a webpage when executing the webpage description file;

receiving the language information returned from the client.

The rule of acquiring the language information for forming a webpage through the client executing the executable file or according to the acquiring request is: successively acquiring the language information of each preset software from the client in order of priority from high to low, judging, by the peripheral apparatus or the client, whether the peripheral apparatus supports the acquired language information, until supported language information is acquired, and adopting the supported language information as the language information for forming a webpage. Adopting default language information as the language information for forming a webpage, when supported language information cannot be acquired from the client.

The rule of acquiring the language information for forming a webpage through the client executing the executable file or according to the acquiring request, further includes: acquiring the language information of each preset software from the client, judging, by the peripheral apparatus or the client, whether the language information of each preset software is consistent with each other, when a judging result is no, returning a language list to the client, and receiving the language information selected by the user according to the language list as the language information for forming a webpage; or acquiring the language information adopted by a most frequently used software among all preset softwares of the client, and adopting the language information as the language information for forming a webpage; or acquiring most frequently used language information among the language information of all preset softwares of the client, and adopting the language information as the language information for forming a webpage; or acquiring the language information of a preset software of the client, and adopting the language information as the language information for forming a webpage. Judging whether the language information acquired from the client is supported or not, when a judging result is no, adopting default language information as the language information for forming a webpage.

The rule of the client invokes the executable file to acquire language information for forming a webpage when executing the webpage description file is:

successively acquiring the language information of each preset software from the client in order of priority from high to low, judging, by the peripheral apparatus or the client, whether the peripheral apparatus supports the acquired language information, until supported language information is acquired, and adopting the supported language information as the language information for forming a webpage.

The method for forming a webpage further includes:

adopting the default language information as the language information for forming a webpage, when supported language information cannot be acquired from the client.

The rule of the client invokes the executable file to acquire the language information for forming a webpage when executing the webpage description file, further includes:

acquiring the language information of each preset software from the client, judging, by the peripheral apparatus or the client, whether each language information is consistent with each other, when a judging result is no, returning a language list to the client, and receiving the language information selected by the user according to the language list as the language information for forming a webpage; or acquiring the language information adopted by a most frequently used software among all preset softwares of the client, and adopting the language information as the language information for forming a webpage; or acquiring most frequently used language information among the language information of all preset softwares of the client, and adopting the language information as the language information for forming a webpage; or acquiring the language information of a preset software of the client, and adopting the language information as the language information for forming a webpage.

The method further includes:

judging whether the language information acquired from the client is supported or not, when a judging result is no, adopting the default language information as the language information for forming a webpage.

Another aspect of the present invention provides a peripheral apparatus, including: an acquiring module, used for acquiring, from a client, language information for forming a webpage, when a webpage forming request sent by the client is received; a sending module, used for generating a language file according to the language information and sending the language file to the client, the client generates webpage data based on the language file and a preset webpage description file, or sending webpage data to the client according to the language information and a preset webpage description file, so that the client displays, on the client according to the webpage data, a webpage formed by adopting the language information.

The sending module is specifically used for: generating a webpage data according to the language information and the preset webpage description file, so that the client displays directly, on the client according to the webpage data, a webpage formed by adopting the language information.

The sending module is specifically used for: generating the language file according to the language information, sending the language file and the preset webpage description file to the client, so that the client displays, on the client combining the webpage description file and the language file, a webpage formed by adopting the language information. A judging module, used for judging whether language information for forming a webpage can be acquired from the client, when a judging result is no, adopting default language information as the language information for forming a webpage, when a judging result is yes, triggering the acquiring module.

The acquiring module is specifically used for: sending a preset executable file for acquiring language information to the client, so that the client executes the executable file to acquire the language information from the client, or sending an acquiring request for acquiring the language information to the client, so that the client acquires the language information from the client according to the acquiring request; receiving the language information returned from the client.

The acquiring module is further used for:

sending the webpage description file to the client;

the acquiring, from the client, language information for forming a webpage including:

sending a preset executable file for acquiring language information to the client, so that the client invokes the executable file to acquire the language information for forming a webpage when executing the webpage description file;

receiving the language information return from the client.

The acquiring module is specifically used for: successively acquiring the language information of each preset software from the client in order of priority from high to low, judging whether the peripheral apparatus supports the acquired language information, until supported language information is acquired, and adopting the supported language information as the language information for forming a webpage.

The acquiring module is also used for: adopting default language information as the language information for forming a webpage, when supported language information cannot be acquired from the client.

The acquiring module is specifically used for: acquiring the language information of each preset software from the client, judging whether the language information of each preset software is consistent with each other, when a judging result is no, returning a language list to the client, and receiving the language information selected by the user according to the language list as the language information for forming a webpage; or acquiring the language information adopted by a most frequently used software among all preset softwares of the client, and adopting the language information as the language information for forming a webpage; or acquiring most frequently used language information among the language information of all preset softwares of the client, and adopting the language information as the language information for forming a webpage; or acquiring the language information of a preset software of the client, and adopting the language information as the language information for forming a webpage.

The acquiring module is further used for: judging whether the language information acquired from the client is supported or not, when a judging result is no, adopting the default language information as the language information for forming a webpage.

The acquiring module is specifically used for:

successively acquiring the language information of each preset software from the client in order of priority from high to low, judging whether the peripheral apparatus supports the acquired language information, until supported language information is acquired, and adopting the supported language information as the language information for forming a webpage.

The acquiring module is also used for:

adopting the default language information as the language information for forming a webpage, when supported language information cannot be acquired from the client.

The acquiring module is specifically used for:

acquiring the language information of each preset software from the client, judging whether the language information of each preset software is consistent with each other, when a judging result is no, returning a language list to the client, and receiving the language information selected by the user according to the language list as the language information for forming a webpage; or acquiring the language information adopted by a most frequently used software among all preset softwares of the client, and adopting the language information as the language information for forming a webpage; or acquiring most frequently used language information among the language information of all preset softwares of the client, and adopting the language information as the language information for forming a webpage; or acquiring the language information of a preset software of the client, and adopting the language information as the language information for forming a webpage.

The acquiring module is further used for:

judging whether the language information acquired from the client is supported or not, when a judging result is no, adopting the default language information as the language information for forming a webpage.

Another aspect of the present invention provides a system for forming a webpage, includes the abovementioned peripheral apparatus, and also the client.

According to the foregoing technical solution, the webpage forming method, peripheral apparatus, and system provided by present invention, after a webpage forming request sent by a client is received, it acquires language information for forming a webpage from the client, and sends webpage data according to the language information to the client, so that the language adopted by the webpage displayed on the client in accordance with the user's habit, which facilities the user.

DESCRIPTION OF EMBODIMENTS

Embodiment 1

The present embodiment provides a webpage forming method, the applicable network architecture of the webpage forming method includes peripheral apparatus and client with network server function, and also is applicable for peripheral apparatus with peripheral network server, the peripheral apparatus is such as printer, multi-function copier, fax machine and scanner and the like. Based on the network server function, when a user types in the website of the peripheral apparatus through the browser of the client, the peripheral apparatus generates webpage data and sends to the client, the client can display the webpage on the browser according to the webpage data, users can browse or set parameter, log and other information of the peripheral apparatus through the webpage. The executive subject of the embodiment is a peripheral apparatus.

Figure 1:
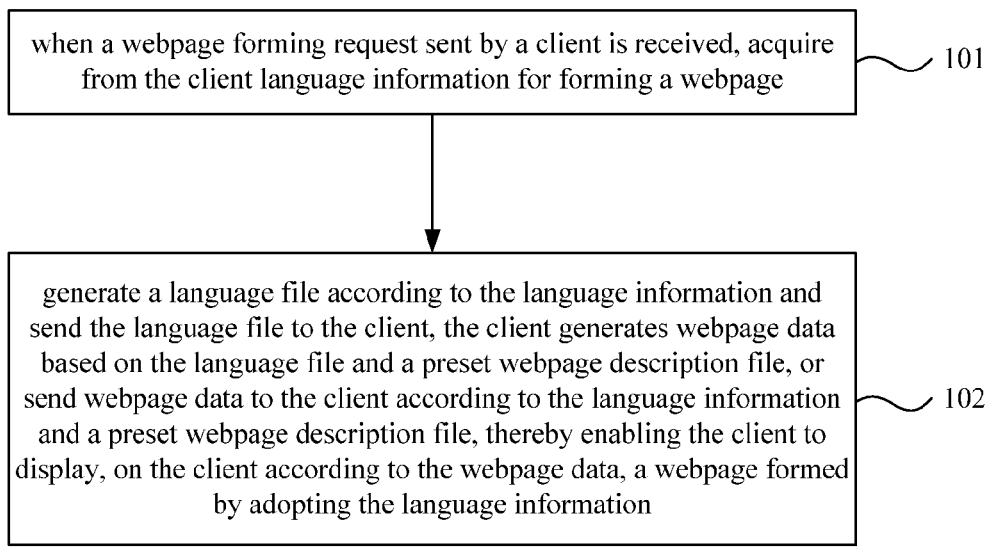
FIG. 1 is a schematic view of a webpage forming method according to an embodiment of the present invention.

As shown in FIG. 1, which is a schematic view of a webpage forming method according to this embodiment.

Step 101, when a webpage forming request sent by a client is received, acquire from the client language information for forming a webpage.

When the peripheral apparatus receives a webpage forming request sent by a client or the webpage of the peripheral apparatus is displayed on the client, the operation of acquiring, from the client, language information for forming a webpage is necessary. This is because the language adopted by the client in different region or country is usually different, for example, the language of a client in China usually adopts Chinese, the language of a client in Japan usually adopts Japanese, the language of a client in U.S. usually adopts English. The language information for forming a webpage is acquired from the client, enabling the language adopted by the webpage requested by the client is suitable for the client.

Step 102, generate a language file according to the language information and send the language file to the client, the client generates webpage data based on the language file and a preset webpage description file, or send webpage data to the client according to the language information and a preset webpage description file, thereby enabling the client to display, on the client according to the webpage data, a webpage formed by adopting the language information.

The preset webpage description file can be stored in the peripheral apparatus in advance, and also can be stored individually, as long as it could be acquired by the peripheral apparatus. The webpage description file could be a hypertext markup language (Hypertext Markup Language, HTML) file, but not limited to HTML file, and also could be other language description files. The client could acquire information of the peripheral apparatus, such as logs, according to the webpage, and also could set parameters of the peripheral apparatus. The webpage data of the present embodiment is the display data used for displaying a webpage, which could include webpage description file, language file, image file and so on.

According to the webpage forming method of the present embodiment, after the peripheral apparatus received a webpage forming request sent by a client, acquires from the client language information for forming a webpage, and sends webpage data according to the language information to the client, enabling that the language adopted by the webpage displaying on the client is in accordance with the user's habit, which facilities usage of the user.

In the present invention, when displaying the webpage of the peripheral apparatus, it is needed to acquire from the client language information for forming a webpage. Thus, the present invention could, when the peripheral apparatus receives a webpage forming request sent by a client, acquire from the client language information for forming a webpage at first, then return webpage data to the client, enabling the client to display, on the client according to the webpage data, a webpage formed by adopting the language information; or when the peripheral apparatus receives a webpage forming request sent by a client, return the foregoing webpage data to the client at first, then acquire from the client language information for forming a webpage, enabling the client to display, on the client according to the webpage data, a webpage formed by adopting the language information.

The difference between the two abovementioned ways lies in: the time to execute the operation of acquiring from the client language information for forming a webpage is different, which is not limited in any way here, as long as it is through acquiring from the client language information for forming a webpage, enabling the client to display, on the client according to the webpage data, a webpage formed by adopting the language information, it all falls in the protect scope of the present invention.

A specific embodiment of the webpage forming request sent by the client in the present invention is described as follows:

When the user starts the network browser of the client and types in the website (such as "http://xxxx/XXX-printer.html") of the peripheral apparatus, the client transmits the webpage request to the peripheral apparatus through a network interface, the webpage request could be a hypertext transfer protocol (Hypertext Transfer Protocol, HTTP) request. The peripheral apparatus dynamically generates a webpage in HTML format, and returns the generated webpage to the client as the response to the HTTP request. The webpage required by the client is mainly used for displaying relevance information of the peripheral apparatus, such as various operation statuses of the image processing device, it is also possible to set the peripheral apparatus through the webpage, the setting could be normal setting, such as power save time, sending status information to designated address through email, and also could be network parameter setting, such as setting the address of the email server, the network address of the peripheral apparatus and so on. The abovementioned peripheral apparatus can include built-in network server, also can take the network server as an individual object arranged outside of the peripheral apparatus, connecting to the peripheral apparatus through the interface connection, and connecting to the client through the network.

Embodiment 2

This embodiment further explains the webpage forming method of embodiment 1.

When acquiring the language information for forming a webpage from the foregoing client, before acquiring, the peripheral apparatus judges whether the language information for forming a webpage can be acquired from the client, when the judging result is no, the default language information is adopted as the language information for forming a webpage; otherwise, executes the operation of acquiring the language information from the client for forming a webpage.

Figure 2:
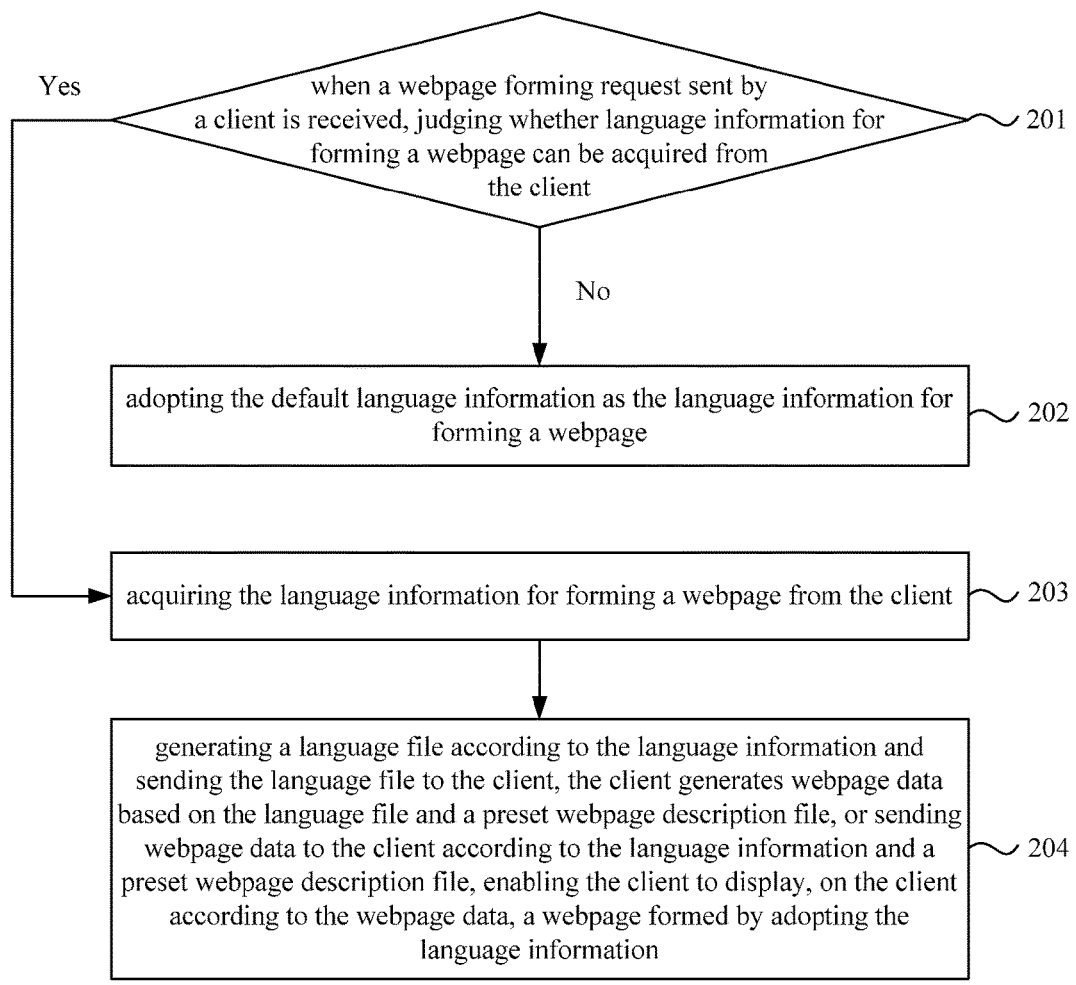
FIG. 2 is a schematic flowchart of a webpage forming method according to another embodiment of the present invention.

As shown in FIG. 2, it is a flowchart of the webpage forming method according to the present embodiment.

Step 201, when a webpage forming request sent by a client is received, judging whether language information for forming a webpage can be acquired from the client, when the judging result is no, executes Step 202, otherwise, executes Step 203.

For example, the peripheral apparatus sends an executable file for acquiring language information to the client, the executable file is such as java script, Visual Basic script and so on. However, not all the clients can execute the executable file due to possible problems of operating system of the clients, at this moment the peripheral apparatus cannot acquire language information for forming a webpage from the client; or, the peripheral apparatus could only acquire the language information through communicating with a specific port of the client, but some of the clients may not have the specific port, or cannot communicate with the specific port due to network problem, at this moment the peripheral apparatus cannot acquire language information for forming a webpage from the client; or, the peripheral apparatus sends an acquiring request for acquiring language information to the client, but some of the clients don't respond to the acquiring request or cannot recognize the acquiring request, at this moment the peripheral apparatus cannot acquire language information for forming a webpage from the client. Of course, there may also include many other situations that cannot acquire language information for forming a webpage from the client, which will not be described here in detail.

Step 202, adopting the default language information as the language information for forming a webpage.

The default language information is namely the preset language information for forming a webpage in the peripheral apparatus.

Step 203, acquiring the language information for forming a webpage from the client.

The method and rule for acquiring the language information for forming a webpage from the client according to the present invention will be described hereinafter.

The rule for acquiring the language information for forming a webpage from the client could be:

successively acquiring the language information of each preset software from the client in order of priority from high to low, judging whether the peripheral apparatus supports the acquired language information or not by the peripheral apparatus or the client, until supported language information is acquired, and adopting the supported language information as the language information for forming a webpage. Optionally, adopting the default language information as the language information for forming a webpage, when the supported language information cannot be acquired from the client.

The rule for acquiring the language information for forming a webpage from the client could also be:

acquiring the language information of each preset software from the client, judging whether each language information is consistent or not by the peripheral apparatus or the client, when the judging result is no, returning a language list to the client, and receiving the language information selected by the user according to the language list as the language information for forming a webpage; or acquiring the language information adopted by the most frequently used software among each preset software of the client, and adopting the language information as the language information for forming a webpage; or acquiring the most frequently used language information among the language information of each preset software of the client, and adopting the language information as the language information for forming a webpage; or acquiring the language information of a preset software of the client, and adopting the language information as the language information for forming a webpage.

Optionally, judging whether the language information acquired from the client can be supported or not, when the judging result is no, adopting the default language information as the language information for forming a webpage.

There are multiple modes for the peripheral apparatus to acquire the language information for forming a webpage from the client, which could include the following:

Mode A: sending a preset executable file for acquiring language information to the client, enabling the client to execute the executable file to acquire the language information from the client, after the client acquired the language information, returning the language information to the peripheral apparatus, the peripheral apparatus receives the language information returned from the client.

The executable file in Mode A could specifically be a file containing program, the program can be written by adopting any program language in the prior art, such as Java language, Visual Basic language, C language, C++ language and so on, which is not specifically limited. In practical application, the executable file could specifically be script file, which is executed by embedding in the webpage description file to acquire the language information, the executable file could also be a file parsed independently by the client to acquire the language information, all the executable files are within the protection scope as long as they can acquire the language information of the client.

Mode B: sending an acquiring request for acquiring the language information to the client, enabling the client to acquire the language information from the client according to the acquiring request, after the client acquired the language information, returning the language information to the peripheral apparatus, the peripheral apparatus receives the returned language information from the client.

In Mode B, the client can receive the acquiring request through a preset monitoring port or a preset language monitor, the monitoring port could be a newly established port in the client for monitoring the acquiring request of the peripheral apparatus. A language identifier could be added in the acquiring request, after the client received the acquiring request, it is identified through the language identifier that the request is used for acquiring language information, after the client acquired the language information of itself, returning the acquired language information to the peripheral apparatus. The language monitor is a kind of software module operating in the client, the language monitor can be used for operations such as real time monitoring the peripheral apparatus.

Mode C: the peripheral apparatus successively acquires the language information of each preset software from the client in order of priority from high to low, and judges whether the acquired language information can be supported, until supported language information is acquired, and adopts the supported language information as the language information for forming a webpage.

The peripheral apparatus can specifically acquire the language information of the client according to Mode C. For example, assume the preset softwares include: system operating software and network browser, the priority of the system operating software is higher than the priority of the network browser. First, the peripheral apparatus acquires default language information of the system operating software from the client, then, the peripheral apparatus judges whether the language information can be supported or not, when the judging result is yes, adopts the default language information of the system operating software as the language information for forming a webpage, when the judging result is no, acquiring default language information of the network browser from the client, and judges whether the language information can be supported or not, when the judging result is yes, adopts the default language information of the network browser as the language information for forming a webpage. Optionally, adopting the preset default language information as the language information for forming a webpage, when supported language information cannot be acquired from the client.

Mode D: acquiring the language information of each preset software from the client;

Judging whether language information is consistent with each other, when the judging result is no, returning a language list to the client, and receiving the language information selected by the user corresponding to the client, according to the language list, as the language information for forming a webpage, the language list includes all the language information.

In Mode D, the peripheral apparatus can acquire the language information of each preset software from the client, for example, it can acquire the default language information of the operating system software, default language information of the network browser, default language information of office software (such as Word) and so on from the client, and judge whether the language information is consistent with each other. Assuming that the language information acquired from the client is all Chinese, then adopting Chinese as the language for forming a webpage. When the language information is not consistent with each other, returning a language list formed by each language information to the client, the user operating the client can select a language to be adopted by the requested webpage in the language list, for example, the default language of the operating system software is Chinese, the default language of the network browser is English, the default language of Word is Korean, then a menu is formed, which contains the characters of "English", "Chinese" and "Korean" for the user of the client to select. The peripheral apparatus adopts the language information selected by the user as the language information for forming a webpage. Optionally, the peripheral apparatus judges whether the language information acquired from the client can be supported or not, when the judging result is no, adopting a preset default language information as the language information for forming a webpage.

Mode E: acquiring the language information adopted by the most frequently used software among preset softwares in the client, and adopting the language information as the language information for forming a webpage.

If there are several most frequently used softwares, randomly select one of them, and adopt the language information of this software as the language information for forming a webpage. Optionally, the peripheral apparatus judges whether the language information acquired from the client can be supported or not, when the judging result is not, adopts preset default language information as the language information for forming a webpage.

Mode F: acquiring the most frequently used language information among the language information of each preset software in the client, and adopting the language information as the language information for forming a webpage.

Optionally, the peripheral apparatus judges whether the language information acquired from the client can be supported or not, when the judging result is no, adopting the preset default language information as the language information for forming a webpage.

Mode G: acquiring the language information of a preset software in the client, and adopts the language information as the language information for forming a webpage.

Different from Mode D, in Mode G, only the language information of a single software is acquired, and the language information is adopted as the language information for forming a webpage. For example, the default language of the operating system software in the client usually reflects the user's language using habit the most, therefore the preset software can be set as the operating system software, when the peripheral apparatus acquires the default language information of the operating system software in the client, it adopts the default language information of the operating system software as the language information for forming a webpage. Optionally, the peripheral apparatus judges whether the language information acquired from the client can be supported or not, when the judging result is no, adopting the preset default language information as the language information for forming a webpage.

Mode H: the peripheral apparatus sends a preset executable file for acquiring language information to the client, enabling the client to successively acquire the language information of each preset software from the client in order of priority from high to low according to the executable file, and judges whether the acquired language information can be supported by the peripheral apparatus according to the executable file, until language information which can be supported by the peripheral apparatus is acquired, and returns the language information to the peripheral apparatus;

The peripheral apparatus receives the language information returned from the client, and adopts the language information as the language information for forming a webpage.

In Mode H, optionally, when the peripheral apparatus receives a message returned from the client that the language information that can be supported by peripheral apparatus cannot be acquired, the peripheral apparatus adopts preset default language information as the language information for forming a webpage. It is easy to think that, the executable file has the function of achieving judgment of the language information which is supported by the peripheral apparatus, thus, the client can judge which language information is supported by the peripheral apparatus according to the executable file, the same applies to the situations hereinafter. In the present mode, the peripheral apparatus sends an executable file to the client, acquires the language information of each preset software through the executable file, and judges whether the acquired language information can be supported by the peripheral apparatus or not, such executable file can significantly reduce the communication traffic between the peripheral apparatus and the client, the peripheral apparatus only receives the judging result by the client, selects a language as the language information for forming a webpage according to this result, thereby reducing the burden of parsing webpage request or processing load of the peripheral apparatus. In the present invention, acquiring the language information of each preset software is practically acquiring the default language information set in each preset software.

Mode I: the peripheral apparatus sends a preset executable file for acquiring language information to the client, enabling the client to execute the executable file, and successively acquire the language information of each preset software from the client in order of priority from high to low;

receives the language information returned from the client, and judges whether the language information can be supported, until supported language information is acquired;

adopts the supported language information as the language information for forming a webpage.

Optionally, in Mode I, when peripheral apparatus cannot acquire supported language information from the client, the preset default language information is adopted as the language information for forming a webpage.

Mode J: the peripheral apparatus sends an acquiring request for acquiring language information to the client, enabling the client to receive the acquiring request through a preset monitoring port or a preset language monitor, and enabling the client to successively acquire the language information of each preset software from the client in order of priority from high to low according to the acquiring request and judge whether the acquired language information can be supported by the peripheral apparatus, until language information which can be supported by the peripheral apparatus is acquired and return the language information to the peripheral apparatus;

the peripheral apparatus receives the language information returned from the client, and adopts the language information as the language information for forming a webpage.

In Mode J, when the peripheral apparatus receives the message returned from the client that language information that can be supported by peripheral apparatus cannot be acquired, the peripheral apparatus adopts preset default language information as the language information for forming a webpage.

Mode K: the peripheral apparatus sends an acquiring request for acquiring language information to the client, enabling the client to receive the acquiring request through a preset monitoring port or a preset language monitor, and enabling the client to successively acquire the language information of each preset software from the client in order of priority from high to low according to the acquiring request;

the peripheral apparatus receives the language information returned from the client, and judges whether the language information can be supported or not, until supported language information is acquired;

the peripheral apparatus adopts the supported language information as the language information for forming a webpage.

In Mode K, optionally, when peripheral apparatus cannot acquire supported language information from the client, the preset default language information is adopted as the language information for forming a webpage.

Mode L: the peripheral apparatus sends a preset executable file for acquiring language information to the client, enabling the client to execute the executable file to acquire the language information of each preset software from the client and judge whether the language information is consistent with each other, when the judging result is no, the client returns a language list to the user, and receives the language information selected by the user corresponding to the client according to the language list, the language list includes all language information, the client returns the language information selected by the user to the peripheral apparatus, the peripheral apparatus receives the language information returned from the client and adopts this language information as the language information for forming a webpage. Optionally, the peripheral apparatus judges whether the language information acquired from the client can be supported or not, when the judging result is no, the peripheral apparatus adopts the preset default language information as the language information for forming a webpage. Or, it may also be, after the client receives the language information selected by the user according to the language list, it judges whether this language information is supported by the peripheral apparatus according to the executable file, if not, sends a message that language information that can be supported by peripheral apparatus cannot be acquired to the peripheral apparatus, when the peripheral apparatus receives this message, it adopts the preset default language information as the language information for forming a webpage.

Mode M: the peripheral apparatus sends a preset executable file for acquiring language information to the client, enabling the client to execute the executable file to acquire the language information of each preset software from the client;

the peripheral apparatus receives each language information returned from the client, and judges whether the language information is consistent with each other or not, when the judging result is no, the peripheral apparatus returns a language list to the client;

the peripheral apparatus receives the language information, selected by the user corresponding to the client according to the language list, as the language information for forming a webpage, the language list includes all language information.

In Mode M, optionally, the peripheral apparatus judges whether the language information acquired from the client can be supported or not, when the judging result is no, the peripheral apparatus adopts the default language information as the language information for forming a webpage. Or, after the client receives the language list, displays the language list to the client user, enabling the user to select language information according to the language list, the client judges whether this language information is supported by the peripheral apparatus or not according to the executable file, when the judging result is no, returns a message that the language information that can be supported by peripheral apparatus cannot be acquired to the peripheral apparatus, after the peripheral apparatus receives this message, adopts the default language information as the language information for forming a webpage.

Mode N: the peripheral apparatus sends a preset executable file for acquiring language information to the client, enabling the client to execute the executable file to acquire the usage frequency of each preset software from the client, the client compares the usage frequency of each preset software, returns the language information adopted by the most frequently used software to the peripheral apparatus;

the peripheral apparatus receives the language information adopted by the most frequently used software sent by the client, and adopts the language information adopted by the most frequently used software as the language information for forming a webpage.

For Mode N, for example, the peripheral apparatus sends an executable file for acquiring language information to the client, the client acquires respective usage frequency of network browser and Word from the client through the executable file, the client compares the usage frequency of each software, assuming that the usage frequency of the browser is highest, then returns the default language information adopted by the browser to the peripheral apparatus, the peripheral apparatus adopts the default language information adopted by the browser as the language information for forming a webpage.

In Mode N, optionally, the peripheral apparatus judges whether the language information acquired from the client can be supported or not, when the judging result is no, the peripheral apparatus adopts the default language information as the language information for forming a webpage. It may also be, when the client acquires the language information adopted by the most frequently used software, it judges whether this language information can be supported by the peripheral apparatus according to the executable file, when the judging result is no, returns the message that the language information that is supported by peripheral apparatus cannot be acquired to the peripheral apparatus, when the peripheral apparatus receives this message, it adopts the default language information as the language information for forming a webpage.

Mode O: the peripheral apparatus sends a preset executable file for acquiring language information to the client, enabling the client to execute the executable file to acquire the language information of each preset software from the client, the client compares the usage frequency of the language information of each preset software, returns the language information which is most frequently used to the peripheral apparatus;

the peripheral apparatus receives the language information which is most frequently used sent by the client, and adopts the language information which is most frequently used as the language information for forming a webpage.

For Mode O, for example, the peripheral apparatus sends an executable file for acquiring language information to the client, the client acquires respective default language information of the operating system software, the network browser and Word from the client through the executable file, compares the usage frequency of each language, assuming that the default language information of the operating system software and the network browser is both Chinese, the default language information of Word is English, then the usage frequency of Chinese is highest, it returns the language information of Chinese to the peripheral apparatus, the peripheral apparatus adopts Chinese as the language information for forming a webpage.

In Mode O, optionally, the peripheral apparatus judges whether the language information acquired from the client can be supported or not, when the judging result is no, the peripheral apparatus adopts the default language information as the language information for forming a webpage. It may also be, when the client acquires the language information which is most frequently used, it judges whether this language information can be supported by the peripheral apparatus according to the executable file, when the judging result is no, returns the message that the language information that is supported by peripheral apparatus cannot be acquired to the peripheral apparatus, when the peripheral apparatus receives this message, it adopts the default language information as the language information for forming a webpage.

Mode P: the peripheral apparatus sends a preset executable file for acquiring language information to the client, enabling the client to execute the executable file to acquire the language information of a preset software from the client;

the peripheral apparatus receives the language information sent by the client, and adopts the language information as the language information for forming a webpage.

In Mode P, optionally, the peripheral apparatus judges whether the language information acquired from the client can be supported or not, when the judging result is no, the peripheral apparatus adopts the default language information as the language information for forming a webpage. It may also be, when the client acquires the language information of a specific preset software, it judges whether this language information can be supported by the peripheral apparatus according to the executable file, when the judging result is no, it returns the message that the language information that is supported by peripheral apparatus cannot be acquired to the peripheral apparatus, when the peripheral apparatus receives this message, it adopts the default language information as the language information for forming a webpage.

Mode Q: the peripheral apparatus sends an acquiring request for acquiring language information to the client, enabling the client to receive the acquiring request through a preset monitoring port or a preset language monitor, the client acquires the language information of each preset software from the client according to the acquiring request, and enabling the client to judge whether the language information is consistent with each other according to the acquiring request, when the judging result is no, the client returns a language list to the user, and receives the language information selected by the user corresponding to the client according to the language list, the language list includes all language information, the client returns the language information selected by the user to the peripheral apparatus;

the peripheral apparatus receives the language information returned from the client, and adopts this language information as the language information for forming a webpage.

In Mode Q, optionally, the peripheral apparatus judges whether the language information acquired from the client can be supported or not, when the judging result is no, the peripheral apparatus adopts the preset default language information as the language information for forming a webpage.

Mode R: the peripheral apparatus sends an acquiring request for acquiring language information to the client, enabling the client to receive acquiring request through a preset monitoring port or a preset language monitor, and acquire the language information of each preset software from the client according to the acquiring request;

the peripheral apparatus receives each language information returned from the client, and judges whether the language information is consistent with each other, when the judging result is no, it returns a language list to the client;

the peripheral apparatus receives the language information selected by the user corresponding to the client according to the language list, the language list includes all language information.

The peripheral apparatus returns the language list to the client, the user which operates the client can see the language list, and make a selection correspondingly.

In Mode R, optionally, the peripheral apparatus judges whether the language information acquired from the client can be supported or not, when the judging result is no, the peripheral apparatus adopts the preset default language information as the language information for forming a webpage. Or, after the client receives the language list, it displays the language list to the client user, enabling the user to select language information according to the language list, the client judges whether this language information is supported by the peripheral apparatus or not according to the acquiring request, when the judging result is no, it returns the message that the language information that is supported by peripheral apparatus cannot be acquired to the peripheral apparatus, after the peripheral apparatus receives this message, it adopts the default language information as the language information for forming a webpage. It can be appreciated that, the acquiring request can include contents indicating that the language information can be supported by the peripheral apparatus, thus, the client can judge which language information is supported by the peripheral apparatus according to the acquiring request, the same applies to the situations hereinafter.

Mode S: the peripheral apparatus sends an acquiring request for acquiring language information to the client, enabling the client to receive the acquiring request through a preset monitoring port or a preset language monitor, and acquire the usage frequency of each preset software from the client according to the acquiring request, and enabling the client to compare the usage frequency of each preset software, and returns the language information adopted by the most frequently used software to the peripheral apparatus;

the peripheral apparatus receives the language information adopted by the most frequently used software returned from the client, and adopts the language information adopted by the most frequently used software as the language information for forming a webpage.

In Mode S, optionally, the peripheral apparatus judges whether the language information acquired from the client can be supported or not, when the judging result is no, the peripheral apparatus adopts the preset default language information as the language information for forming a webpage. It may also be, when the client acquires the language information adopted by the most frequently used software, it judges whether this language information can be supported by the peripheral apparatus or not according to the acquiring request, when the judging result is no, it returns the message that the language information that is supported by peripheral apparatus cannot be acquired to the peripheral apparatus, after the peripheral apparatus receives this message, it adopts the default language information as the language information for forming a webpage.

Mode T: the peripheral apparatus sends an acquiring request for acquiring language information to the client, enabling the client to receive the acquiring request through a preset monitoring port or a preset language monitor, and acquire the language information of each preset software from the client according to the acquiring request, and enabling the client to compare the usage frequency of the language information of each preset software, returns the language information which is most frequently used to the peripheral apparatus;

the peripheral apparatus receives the language information which is most frequently used returned from the client, and adopts the language information which is most frequently used as the language information for forming a webpage.

In Mode T, optionally, the peripheral apparatus judges whether the language information acquired from the client can be supported or not, when the judging result is no, the peripheral apparatus adopts the preset default language information as the language information for forming a webpage. It may also be, when the client acquires the language information which is most frequently used, it judges whether this language information can be supported by the peripheral apparatus or not according to the acquiring request, when the judging result is no, it returns the message that the language information that is supported by peripheral apparatus cannot be acquired to the peripheral apparatus, after the peripheral apparatus receives this message, it adopts the default language information as the language information for forming a webpage.

Mode U: the peripheral apparatus sends an acquiring request for acquiring language information to the client, enabling the client to receive the acquiring request through a preset monitoring port or a preset language monitor, and acquire the language information of a preset software from the client according to the acquiring request;

the peripheral apparatus receives the language information returned from the client, and adopts the language information as the language information for forming a webpage.

In Mode U, optionally, the peripheral apparatus judges whether the language information acquired from the client can be supported or not, when the judging result is no, the peripheral apparatus adopts the preset default language information as the language information for forming a webpage. It may also be, when the client acquires the language information of a specific preset software, it judges whether this language information can be supported by the peripheral apparatus or not according to acquiring request, when the judging result is no, it returns the message that the language information that is supported by peripheral apparatus cannot be acquired to the peripheral apparatus, when the peripheral apparatus receives this message, it adopts the default language information as the language information for forming a webpage.

It should be noted that, when acquiring language information using the abovementioned modes, if the supported language information cannot be acquired from the client, the default language information is adopted as the language information for forming a webpage. Moreover, the operation of judging whether the acquired language information can be supported by the peripheral apparatus or not can be performed by the peripheral apparatus itself, and also can be performed by the client, if it is performed by the client, specifically, the language information supported by the peripheral apparatus can be carried in the executable file or the acquiring request sent to the client, thus the client can judge whether the acquired language information can be supported by the peripheral apparatus or not according to the executable file or the acquiring request.

In conclusion, in the present invention, the webpage of the peripheral apparatus is displayed through language information acquired from the client, which differs from the manner in the prior art that the webpage of the peripheral apparatus is displayed through a constant default language, therefore, the present invention don't have to code for the default language of the webpage of the peripheral apparatus, thus don't need to amend the products with respect to different countries.

Step 204, generating a language file according to the language information and sending the language file to the client, the client generates webpage data based on the language file and a preset webpage description file, or sending webpage data to the client according to the language information and a preset webpage description file, enabling the client to display, on the client according to the webpage data, a webpage formed by adopting the language information.

The specific implementation mode of: sending webpage data to the client according to the language information and a preset webpage description file, enabling the client to display, on the client according to the webpage data, a webpage formed by adopting the language information in the above step, could be one of the following:

Mode One: generating a language file according to the language information;

generating webpage data according to the language file and a preset webpage description file, enabling the client to directly display, on the client according to the webpage data, a webpage formed by adopting the language information.

In Mode One, the peripheral apparatus generates webpage data according to the acquired language information and a preset webpage description file, enabling the client to directly generate a webpage according to the webpage data, and the language information adopted by the webpage is the language information acquired from the client by the peripheral apparatus. The preset webpage description file can be stored in the peripheral apparatus, also can be stored individually, as long as it could be acquired by the peripheral apparatus.

Mode Two: sending a preset webpage description file to the client;

generating a language file according to the language information and sends the language file to the client, enabling the client to generate webpage data by combining the webpage description file and the language file, and enabling the client to display, on the client according to the webpage data, a webpage formed by adopting the language information.

Mode Three: generating a language file according to the language information and sending the language file and a preset webpage description file to the client, enabling the client to generate webpage data by combining the webpage description file and the language file, and enabling the client to display, on the client according to the webpage data, a webpage formed by adopting the language information.

In both Mode Two and Mode Three, the webpage is generated by the client through combining the language file and a webpage description file. The difference lies in, in Mode Two, the sending a webpage description file to the client is before the operation of generating a language file, which can be understood as, when the peripheral apparatus receives the request for forming a webpage sent from the client, it immediately sends a webpage description file to the client, then sends a language file to the client; in Mode Three, the sending a webpage description file to the client after generating a language file, which can be understood as, the peripheral apparatus sends a language file and a webpage description file to the client at the same time, it also could be, send a language file to the client at first, then send a webpage description file to the client, it is not specifically limited.

Of course, there are multiple implementation modes of Step 204, which can be set according to actual requirements, and will not be described here.

It should be noted that, any implementation mode of Step 203 could be combined with any implementation mode of Step 204.

The language file of the present invention is a file containing data of each language (such as Chinese, English) for displaying the webpage description file. The number of language files is based on the number of languages which can be supported by the peripheral apparatus. The peripheral apparatus generates a language file according to the language information could also be understood as the peripheral apparatus invokes the language file corresponding to the acquired language information according to the language information acquired from the client. Therefore, the language file could be dynamically generated according to the acquired language information, or stored in the peripheral apparatus in advance, also could be stored individually, as long as it could be acquired by the peripheral apparatus, the peripheral apparatus invokes corresponding language file according to acquired language information.

In the webpage forming method of this embodiment, acquiring language information in accordance with the user's habit from the client, such as acquiring language information according to the priority, the usage frequency etc of the daily used software in the client, and sending webpage data to the client according to the acquired language information and a preset webpage description file, enabling the client to display for the user, according to the webpage data, a webpage formed by adopting the acquired language information, thus, the user could see a webpage corresponding to his customary language without manually changing the language information, thereby greatly facilitates the users.

Embodiment 3

This embodiment provides a specific webpage forming method, based on the first manner of Embodiment 1 combining with the foregoing Mode P of acquiring language information for forming a webpage from the client.

Figure 3A:
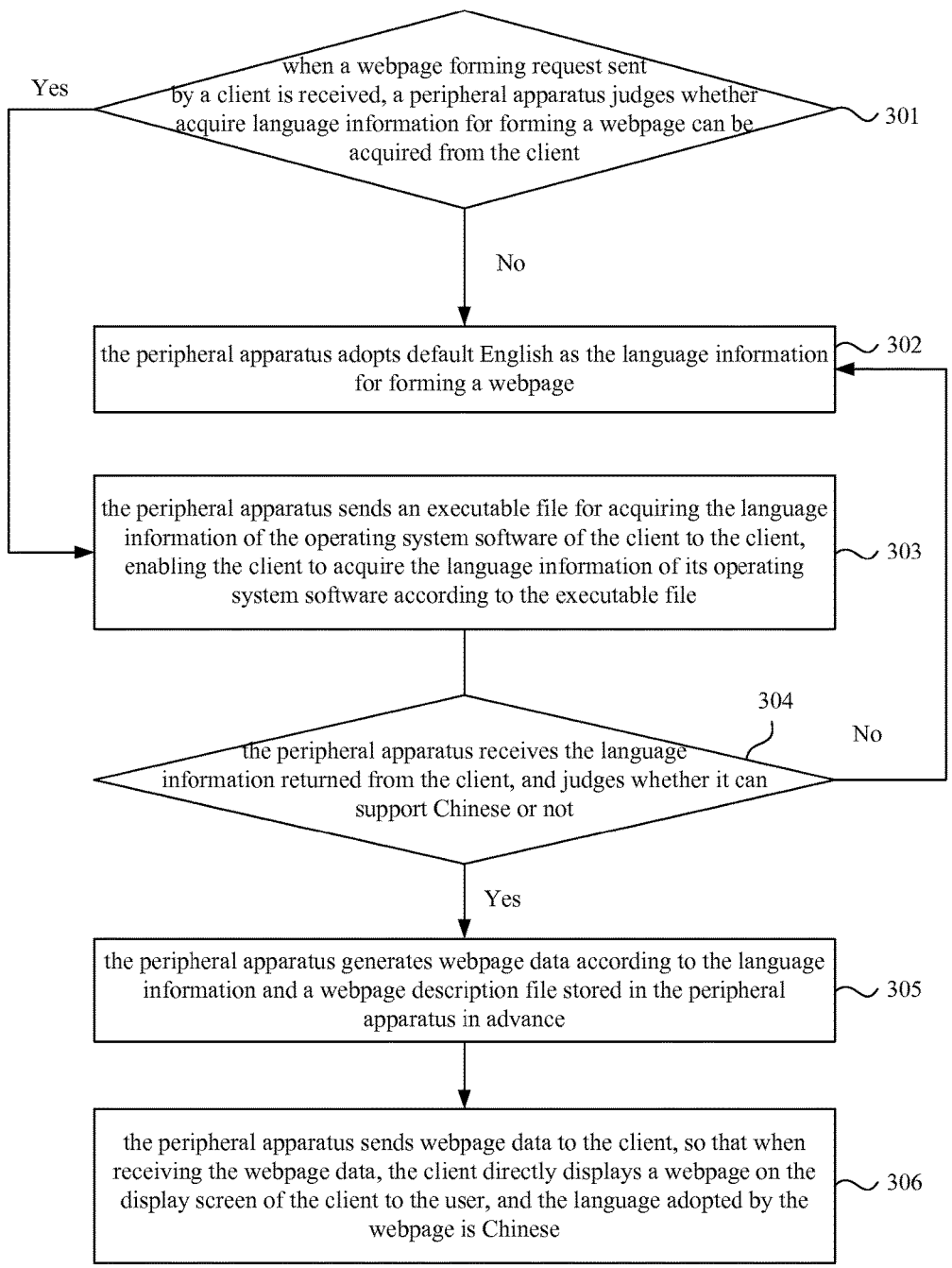
FIG. 3A is a schematic flowchart of a webpage forming method according to still another embodiment of the present invention.

As shown in FIG. 3A, it is a flowchart of the webpage forming method according to this embodiment.

Step 301, when a webpage forming request sent by a client is received, a peripheral apparatus judges whether acquire language information for forming a webpage can be acquired from the client, when the judging result is no, execute Step 302, otherwise, execute Step 303.

Step 302, the peripheral apparatus adopts default English as the language information for forming a webpage.

Step 303, the peripheral apparatus sends an executable file for acquiring the language information of the operating system software of the client to the client, enabling the client to acquire the language information of its operating system software according to the executable file, in this embodiment, the language information of operating system software is Chinese.

Step 304, the peripheral apparatus receives the language information returned from the client, and judges whether it can support Chinese or not, when the judging result is yes, execute Step 305, otherwise, execute Step 302.

Step 305, the peripheral apparatus generates webpage data according to the language information and a webpage description file stored in the peripheral apparatus in advance.

Step 306, the peripheral apparatus sends webpage data to the client, so that when receiving the webpage data, the client directly displays a webpage on the display screen of the client to the user, and the language adopted by the webpage is Chinese.

The language information of the operating system software of the client reflects the user's language using habit the most, therefore, according to the webpage forming method in this embodiment, the client automatically displays the webpage of the peripheral apparatus according to the user's language habit, the user could get a webpage corresponding to its customary language without manually changing the language information, which greatly facilitates the users.

Embodiment 4

This embodiment provides a specific webpage forming method, based on the second manner of Embodiment 1 combining with the foregoing Mode H of acquiring language information for forming a webpage from the client.

Figure 3B:
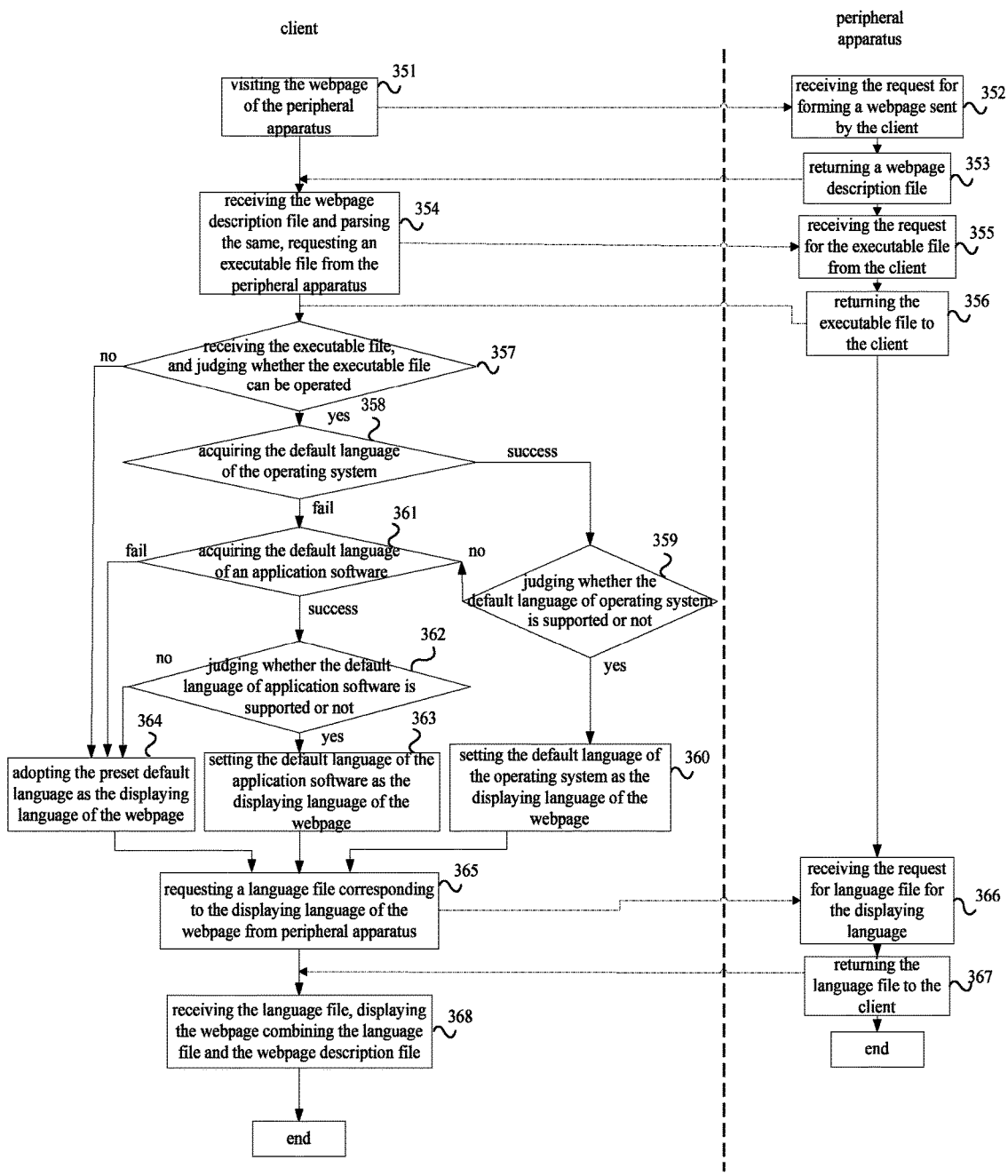
FIG. 3B is a schematic flowchart of a webpage forming method according to still another embodiment of the present invention.

As shown in FIG. 3B:

Step 351: at client side, visiting the webpage of peripheral apparatus. The client will send a request for forming a webpage to the peripheral apparatus at this time.

Step 352: at peripheral apparatus side, receiving the request for forming a webpage sent by the client.

Step 353, the peripheral apparatus returns a webpage description file, other files such as image file etc needed for displaying the webpage can also be returned.

Step 354: at client side, receiving the webpage description file and parsing the same, requesting an executable file from the peripheral apparatus. Here, when parsing the webpage description file, the parsing is conducted until it becomes necessary to invoke an executable file, the executable file is used for acquiring language information for forming a webpage from the client.

Step 355: at peripheral apparatus side, receiving the request for the executable file from the client.

Step 356, the peripheral apparatus returns the executable file to the client.

Step 357: at client side, receiving the executable file, and judging whether the executable file can be operated; when the judging result is yes, start to operate executable file, enter into Step 358; when the judging result is no, enter into Step 364. Operating the executable file here actually means the operation of starting to acquire the language information for forming a webpage, when judging that the executable file cannot be operated, it usually means an error or a run time exception occurs during the client executing the executable file, it could also be other situations, which will not be described here;

Step 358: acquiring the default language of the operating system, when succeeded, execute Step 359, when failed, execute Step 361.

Step 359, judging whether the default language of operating system is supported or not, which specifically is: the client judges whether the peripheral apparatus supports the default language of operating system according to the executable file, when the judging result is yes, execute Step 360, otherwise execute Step 361.

Step 360, setting the default language of the operating system as the displaying language of the webpage, the operation of acquiring the language information for forming a webpage ends here, enter into Step 365.

Step 361, acquiring the default language of an application software, the application software could specifically be a network browser. When succeeded, execute Step 362, otherwise, execute Step 364.

Step 362, judging whether the default language of application software is supported or not, which specifically is: the client judges whether the peripheral apparatus supports the default language of the application software according to the executable file, when the judging result is yes, execute Step 363, otherwise execute Step 364.

Step 363, setting the default language of the application software as the displaying language of the webpage, the operation of acquiring the language information for forming a webpage ends here, enter into Step 365.

Step 364, adopting the preset default language as the displaying language of the webpage, which specifically is: when the language information supported by the peripheral apparatus cannot be acquired from the client, setting the preset default language information of the peripheral apparatus as the language information for displaying the webpage, the operation of acquiring the language information for forming a webpage ends here, enter into Step 365.

Step 365: the client requests a language file corresponding to the displaying language of the webpage from peripheral apparatus.

Step 366: the peripheral apparatus receives the request for language file for the displaying language.

Step 367, the peripheral apparatus returns the language file to the client.

Step 368: at client side, receiving the language file, displaying the webpage combining the language file and the webpage description file.

According to the webpage forming method in this embodiment, the user could get a webpage corresponding to its customary language without manually changing the language information, which greatly facilitates the users, and significantly reduces the communication traffic between the peripheral apparatus and the client, the peripheral apparatus only receives the judging result from the client, selects a language as the language information for forming a webpage depending on this result, thereby reducing the burden of parsing webpage request or processing load of the peripheral apparatus.

Embodiment 5

This embodiment provides a peripheral apparatus, for executing the webpage forming method of Embodiment 1. The peripheral apparatus could be a printer, a multi-function photocopier, a fax machine or a scanner and the like. Based on the function of the network server, when the user types in the website of the peripheral apparatus through the browser of the client, the peripheral apparatus generates webpage data and sends the same to the client, the client can display the webpage on the browser according to the webpage data, the user can browse or set the parameter, log and other information of the peripheral apparatus through the webpage. The executive body of the embodiment is the peripheral apparatus.

Figure 4:
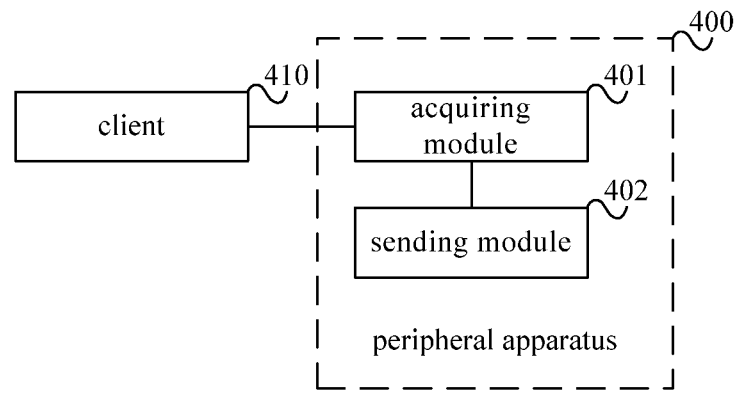
FIG. 4 is a structural diagram of a peripheral apparatus according to an embodiment of the present invention.

As shown in FIG. 4, it is a structure diagram of the peripheral apparatus according to this embodiment. The peripheral apparatus 400 includes an acquiring module 401 and a sending module 402.

The acquiring module 401 is used for acquiring from a client 410 language information for forming a webpage, when a webpage forming request sent by the client 410 is received; the sending module 402 is used for generating a language file according to the language information and sending the language file to the client, the client generates webpage data according to the language file and a preset webpage description file, or sending webpage data to the client 410 according to the language information and a preset webpage description file, enabling the client 410 to display, on the client 410 according to the webpage data, a webpage formed by adopting the language information.

The operating method of the peripheral apparatus 400 in this embodiment is consistent with Embodiment 2, which will not be repeated here.

According to this embodiment, after the peripheral apparatus 400 receives the request for forming a webpage from the client 410, it firstly acquires the language information for forming a webpage from the client 410, and sends webpage data according to the language information to the client 410, or after the peripheral apparatus 400 receives the webpage forming request sent by client 410, returns webpage data to the client 410 first, then acquires the language information for forming a webpage from the client 410, so that the language adopted by the webpage displayed on the client 410 is in accordance with the user's habit, which facilities the user.

Embodiment 6

This embodiment further explains the structure of the peripheral apparatus of Embodiment 5.

Optionally, the sending module 402 in the peripheral apparatus 400 of this embodiment is specifically used for:

generating a language file according to the language information;

generating webpage data according to the language file and a preset webpage description file, enabling the client 410 to display directly, on the client 410 according to the webpage data, a webpage formed by adopting the language information.

Optionally, the sending module 402 in the peripheral apparatus 400 of this embodiment is specifically used for:

sending a preset webpage description file to the client 410, generating a language file according to the language information, and sending the language file to the client 410, enabling the client 410 to display, on the client 410 combining the webpage description file and the language file, a webpage formed by adopting the language information, or generating a language file according to the language information, sending the language file and a preset webpage description file to the client 410, enabling the client 410 to display, on the client 410 combining the webpage description file and the language file, a webpage formed by adopting the language information.

Figure 5:
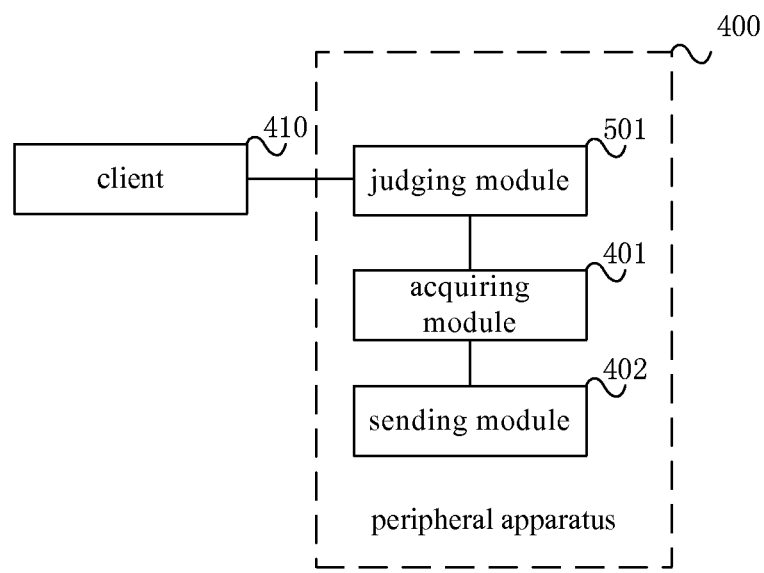
FIG. 5 is a structural diagram of a peripheral apparatus according to another embodiment of the present invention.

Optionally, as shown in FIG. 5, the peripheral apparatus 400 of this embodiment also includes a judging module 501, the judging module 501 is used for judging whether the language information for forming a webpage can be acquired from the client 410, when the judging result is no, adopting the default language information as the language information for forming a webpage, when the judging result is yes, triggering the acquiring module 401. When the peripheral apparatus 400 includes the judging module 501, the peripheral apparatus 400 can send an acquiring request to the judging module 501 at first, then the judging module 501 sends the acquiring request to the acquiring module 401, it could also be, the peripheral apparatus 400 sends an acquiring request to the acquiring module 401 at first, then the acquiring module 401 sends the acquiring request to the judging module 501, after the judging operation of the judging module 501, then the following operations are executed.

Optionally, the acquiring module 401 in the peripheral apparatus 400 is specifically used for:

sending a preset executable file for acquiring language information to the client 410, enabling the client 410 to execute the executable file to acquire the language information from the client 410, or sending an acquiring request for acquiring language information to the client 410, enabling the client 410 to acquire the language information from the client 410 according to the acquiring request;

receiving the language information returned from the client 410.

Optionally, the acquiring module 401 is specifically used for:

successively acquiring the language information of each preset software from the client 410 in order of priority from high to low, judging whether the peripheral apparatus 400 supports the acquired language information, until supported language information is acquired, and adopting the supported language information as the language information for forming a webpage;

or the client 410 successively acquires the language information of each preset software from the client 410 in order of priority from high to low, and the client 410 judges whether the peripheral apparatus 400 supports the acquired language information, until supported language information is acquired, and returns the supported language information to the peripheral apparatus 400, here the acquiring module 401 is only used for acquiring the judging result returned from the client 410, then selecting a language as the language information for forming a webpage according to the judging result. For example, the judging result of the client 410 is that supported language information is successfully acquired, the acquiring module 401 receives the supported language information returned from the client, and adopts this supported language information as the language information for forming a webpage; if the judging result of the client 410 is that supported language information cannot be acquired, when the acquiring module 401 receives the message returned from the client 410 that supported language information cannot be acquired, adopts the preset default language information as the language information for forming a webpage.

Optionally, the acquiring module 401 is specifically used for: acquiring the language information of each preset software from the client 410, judging whether the language information is consistent with each other, when the judging result is no, returning a language list to the client 410, and receiving the language information as the language information for forming a webpage selected by the user according to language list; or the client 410 acquires the language information of each preset software and judges whether the language information is consistent with each other, here the acquiring module 401 is only used for receiving the judging result returned from the client 410, and returning different messages to the client 410 according to the judging result. For example, when the judging result received by the acquiring module 401 that the language information is consistent, adopts the consistent language information, returned from the client 410, as the language information for forming a webpage; when the received judging result is that the language information is not consistent, returns a language list to the client 410, and receives the language information as the language information for forming a webpage selected by the user according to language list.

Optionally, the acquiring module 401 is further specifically used for:

acquiring the language information adopted by the most frequently used software of all preset softwares of the client 410, and adopting the language information as the language information for forming a webpage; or acquiring the most frequently used language information of the language information of each preset software of the client 410, and adopting the language information as the language information for forming a webpage; or acquiring the language information of a preset software of the client 410, and adopting the language information as the language information for forming a webpage.

The acquiring module 401 can also be used for judging whether the language information acquired from the client 410 can be supported or not, when the judging result is no, adopts the preset default language information as the language information for forming a webpage.

Optionally, the acquiring module 401 in the peripheral apparatus 400 is specifically used for executing operations according to Mode a or the combination of Mode a and Mode b:

Mode a: successively acquiring the language information of each preset software from the client 410 in order of priority from high to low, and judging whether the acquired language information can be supported or not, until supported language information is acquired, and adopting the supported language information as the language information for forming a webpage;

Mode b: adopting the preset default language information as the language information for forming a webpage, when supported language information cannot be acquired from the client 410.

Optionally, the acquiring module 401 in the peripheral apparatus 400 is specifically used for executing operations according to any one of the following modes: Mode c, Mode d, a combination of Mode c and Mode e1, a combination of Mode d and Mode e2:

Mode c: sending a preset executable file for acquiring language information to the client 410, enabling the client 410 to successively acquire the language information of each preset software from the client 410 in order of priority from high to low according to the executable file, and to judge whether the acquired language information can be supported by the peripheral apparatus 400 according to the executable file, until language information supported by peripheral apparatus 400 is acquired, and returning the language information to the peripheral apparatus 400, receiving the language information returned from the client 410, and adopting the language information as the language information for forming a webpage; or Mode d: sending a preset executable file for acquiring language information to the client 410, enabling the client 410 to execute the executable file, and successively acquiring the language information of each preset software from the client 410 in order of priority from high to low, receiving the language information returned from the client 410, and judging whether the language information can be supported or not, until supported language information is acquired, and adopting the supported language information as the language information for forming a webpage;

Mode e1: adopting the preset default language information as the language information for forming a webpage, when receiving the message returned from the client 410 that language information that is supported by peripheral apparatus 400 cannot be acquired;

Mode e2: adopting the preset default language information as the language information for forming a webpage, when supported language information cannot be acquired from the client 410.

Optionally, the acquiring module 401 in the peripheral apparatus 400 is specifically used for executing operations according to any one of the following modes: Mode f, Mode g, a combination of Mode f and Mode h1, a combination of Mode g and Mode h2:

Mode f: sending an acquiring request for acquiring language information to the client 410, enabling the client 410 to receive the acquiring request through a preset monitoring port or a preset language monitor, and enabling the client 410 to successively acquire the language information of each preset software from the client 410 in order of priority from high to low according to the acquiring request and to judge whether the acquired language information can be supported by the peripheral apparatus 400, until acquired language information which can be supported by the peripheral apparatus 400 and return the language information to the peripheral apparatus 400, receiving the language information returned from the client 410, and adopting the language information as the language information for forming a webpage; or Mode g: sending an acquiring request for acquiring language information to the client 410, enabling the client 410 to receive the acquiring request through a preset monitoring port or a preset language monitor, and the client successively acquires the language information of each preset software from the client 410 in order of priority from high to low according to the acquiring request, receiving the language information returned from the client 410, and judging whether the language information can be supported or not, until supported language information is acquired, and adopting the supported language information as the language information for forming a webpage;

Mode h1: adopting the preset default language information as the language information for forming a webpage, when receiving the message returned from the client 410 that the language information that is supported by peripheral apparatus 400 cannot be acquired;

Mode h2: adopting the preset default language information as the language information for forming a webpage, when supported language information cannot be acquired from the client 410.

Optionally, the acquiring module 401 in the peripheral apparatus 400 is specifically used for executing operations according to any one of the following modes: Mode i, Mode j, Mode k, Mode l, a combination of Mode i and Mode m, a combination of Mode j and Mode m, a combination of Mode k and Mode m, a combination of Mode l and Mode m:

Mode i: acquiring the language information of each preset software from the client 410, and judging whether the language information is consistent with each other, when the judging result is no, returning a language list to the client 410, and receiving the language information, selected by the user corresponding to the client according to the language list, as the language information for forming a webpage, the language list includes all language information;

Mode j: acquiring the language information adopted by the most frequently used software of each preset software from client 410, and adopting the language information as the language information for forming a webpage;

Mode k: acquiring the language information which is most frequently used of the language information of each preset software from client 410, and adopting the language information as the language information for forming a webpage;

Mode l: acquiring the language information of a preset software from the client 410, and adopting the language information as the language information for forming a webpage;

Mode m: judging whether the language information acquired from the client 410 can be supported or not, when the judging result is no, adopting the preset default language information as the language information for forming a webpage.

Optionally, the acquiring module 401 in the peripheral apparatus 400 is specifically used for executing operations according to any one of the following modes:

Mode n, Mode o, Mode p, Mode q, Mode r, a combination of Mode n and Mode s, a combination of Mode o and Mode s, a combination of Mode p and Mode s, a combination of Mode q and Mode s, a combination of Mode r and Mode s:

Mode n: sending a preset executable file for acquiring language information to the client 410, enabling the client 410 to execute the executable file to acquire the language information of each preset software from the client 410, and judge whether language information is consistent with each other, when the judging result is no, the client 410 returns a language list to the user, and receives the language information selected by the user corresponding to the client according to the language list, the language list includes all language information, the client 410 returns the language information selected by the user to the peripheral apparatus 400, receiving the language information returned from the client 410 and adopting this language information as the language information for forming a webpage;

Mode o: sending a preset executable file for acquiring language information to the client 410, enabling the client 410 to execute the executable file to acquire the language information of each preset software from the client 410, receiving each language information returned from the client 410, and judging whether the language information is consistent with each other, when the judging result is no, returning a language list to the client 410, and receiving the language information selected by the user corresponding to the client according to the language list, the language list includes all language information;

Mode p: sending a preset executable file for acquiring language information to the client 410, enabling the client 410 to execute the executable file to acquire the usage frequency of each preset software from the client 410, and enabling the client 410 to compare the usage frequency of each preset software, return the language information adopted by the most frequently used software to the peripheral apparatus 400; receiving the language information adopted by the most frequently used software sent by the client 410, and adopting the language information adopted by the most frequently used software as the language information for forming a webpage;

Mode q: sending a preset executable file for acquiring language information to the client 410, enabling the client 410 to execute the executable file to acquire the language information of each preset software from the client 410, enabling the client 410 to compare the usage frequency of the language information of each preset software, return the language information which is most frequently used to the peripheral apparatus 400; receiving the language information which is most frequently used sent by the client 410, and adopting the language information which is most frequently used as the language information for forming a webpage;

Mode r: sending a preset executable file for acquiring language information to the client 410, enabling the client 410 to execute the executable file to acquire the language information of a preset software from the client 410, receiving the language information sent by the client 410, and adopting the language information as the language information for forming a webpage;

Mode s: judging whether the language information acquired from the client 410 can be supported or not, when the judging result is no, adopting the preset default language information as the language information for forming a webpage.

Optionally, the acquiring module 401 in the peripheral apparatus 400 is specifically used for executing operations according to any one of the following mode:

Mode t: Mode u, Mode v, Mode w, Mode x, a combination of Mode t and Mode y, a combination of Mode u and Mode y, a combination of Mode v and Mode y, a combination of Mode w and Mode y, a combination of Mode x and Mode y.

Mode t: sending an acquiring request for acquiring language information to the client 410, enabling the client 410 to receive the acquiring request through a preset monitoring port or a preset language monitor, and to acquire the language information of each preset software from the client 410 according to the acquiring request, and enabling the client 410 to judge whether the language information is consistent with each other according to the acquiring request, when the judging result is no, the client 410 returns a language list to the user, and receives the language information selected by the user corresponding to the client according to the language list, the language list includes all language information, the client 410 returns the language information selected by the user to the peripheral apparatus 400, receiving the language information returned from the client 410, and adopting this language information as the language information for forming a webpage;

Mode u: sending an acquiring request for acquiring language information to the client 410, enabling the client 410 to receive the acquiring request through a preset monitoring port or a preset language monitor, and to acquire the language information of each preset software from the client 410 according to the acquiring request, receiving each language information returned from the client 410, and judging whether the language information is consistent with each other, when the judging result is no, returning a language list to the client 410, receiving the language information selected by the user corresponding to the client according to the language list and adopting the same as the language information for forming a webpage, the language list includes all language information;

Mode v: sending an acquiring request for acquiring language information to the client 410, enabling the client 410 to receive the acquiring request through a preset monitoring port or a preset language monitor, and to acquire the usage frequency of each preset software from the client 410 according to the acquiring request, and enabling the client 410 to compare the usage frequency of each preset software, and returns the language information adopted by the most frequently used software to the peripheral apparatus 400; receiving the language information adopted by the most frequently used software returned from the client 410, and adopting the language information adopted by the most frequently used software as the language information for forming a webpage;

Mode w: sending an acquiring request for acquiring language information to the client 410, enabling the client 410 to receive the acquiring request through a preset monitoring port or a preset language monitor, and to acquire the language information of each preset software from the client 410 according to the acquiring request, enabling the client 410 to compare the usage frequency of the language information of each preset software, returns the language information which is most frequently used to the peripheral apparatus 400; receiving the language information which is most frequently used returned from the client 410, and adopting the language information which is most frequently used as the language information for forming a webpage;

Mode x: sending an acquiring request for acquiring language information to the client 410, enabling the client 410 to receive the acquiring request through a preset monitoring port or a preset language monitor, and to acquire the language information of a preset software from the client 410 according to the acquiring request, receiving the language information returned from the client 410, and adopting the language information as the language information for forming a webpage;

Mode y: judging whether the language information acquired from the client 410 can be supported or not, when the judging result is no, adopting the preset default language information as the language information for forming a webpage.

The operating method of the peripheral apparatus 400 in this embodiment is consistent with Embodiment 2, which will not be repeated here.

The peripheral apparatus 400 in this embodiment, acquires language information in accordance with the user's habit from the client 410, for example, acquires language information according to the priority, the usage frequency etc of the daily used software in the client 410, and sends webpage data to the client 410 according to the acquired language information and a preset webpage description file, enabling the client 410 to display to the user, according to the webpage data, a webpage formed by adopting the language information, thus, the user could get a webpage corresponding to its customary language without manually changing the language information, which greatly facilitates the users.

The present invention also provides a webpage forming system, the webpage forming system includes the peripheral apparatus 400 in any of the abovementioned embodiments, also includes the client 410 in any of the abovementioned embodiments.

A person of ordinary skill in the art should understand that all or a part of the steps to achieve the methods described in foregoing embodiments could be completed by hardware related to program instruction, the foregoing program may be stored in a computer-readable storage medium, when the program is executed, executes the steps comprising the methods described in foregoing embodiments; the foregoing storage medium includes: any medium that can store program codes, such as a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof; however, these modifications or replacements don't make the corresponding technical solutions departing from the scope of the technical solutions of the embodiments of the present invention.

What is claimed is:

1. A method for forming a webpage by a client coupled to a peripheral apparatus by a communication network, comprising:

when a webpage forming request sent by the client is received, acquiring, by the peripheral apparatus, from the client, language information for forming the webpage;

wherein the acquiring, by a peripheral apparatus, from the client, language information for forming a webpage includes:

sending, by the peripheral apparatus, a preset executable file for acquiring language information to the client, executing, by the client, the executable file from the peripheral apparatus to acquire language information from an operating system and each of a plurality of preset software applications installed on the client, determining whether the language information from the operating system and each of the plurality of preset software applications is consistent, in response to determining that the language information from the operating system and each of the plurality of preset software applications is not consistent, obtaining a language list based on the language information from the operating system and each of the plurality of preset software applications; prompting a user to select one language from the language list; returning the language information corresponding to the selected language; and receiving, by the peripheral apparatus, the language information returned from the client; and generating, by the peripheral apparatus, a language file according to the language information and sending the language file to the client, wherein the client generates webpage data based on the language file and a preset webpage description file so that the client displays, on the client according to the webpage data, a webpage formed by adopting the language information.

2. The method for forming a webpage according to claim 1, before acquiring, by a peripheral apparatus, from the client, language information for forming a webpage, further comprising:

judging, by the peripheral apparatus, whether the language information for forming a webpage can be acquired from the client, according to a response condition of the client, when a judging result is no, adopting, by the peripheral apparatus, default language information as the language information for forming a webpage, when a judging result is yes, executing, by the peripheral apparatus, the operation of acquiring, from the client, language information for forming a webpage.

3. The method for forming a webpage according to claim 1, before acquiring, by a peripheral apparatus, from the client, language information for forming a webpage, further comprising:

sending, by the peripheral apparatus, the webpage description file to the client.

4. The method for forming a webpage according to claim 1, further comprising:

judging, by the peripheral apparatus, whether the peripheral apparatus supports the returned language information or not, and when a judging result is that the returned language information cannot be supported, adopting, by the peripheral apparatus, preset default language information as the language information for forming a webpage.

5. A peripheral apparatus, comprising:

a non-transitory processor readable medium storing instructions; and a processor executing the instructions stored in the non-transitory processor readable medium, which configures the apparatus to:

acquire, from a client, language information for forming a webpage, when a webpage forming request sent by the client is received;

generate a language file according to the language information and send the language file to the client, the client generates webpage data based on the language file and a preset webpage description file, so that the client displays, on the client according to the webpage data, a webpage formed by adopting the language information, wherein, to acquire the language information for forming a webpage, the apparatus is further configured to:

send a preset executable file for acquiring language information to the client, such that the client executes the executable file from the peripheral apparatus to acquire language information from an operating system and each of a plurality of preset software applications installed on the client, determines whether the language information from the operating system and each of the plurality of preset software applications is consistent, in response to determining that the language information from the operating system and each of the plurality of preset software applications is not consistent, obtains a language list based on the language information from the operating system and each of the plurality of preset software applications, prompts a user to select one language from the language list, and returns the language information corresponding to the selected language; and receive the language information returned from the client.

6. The peripheral apparatus according to claim 5, wherein the apparatus is further configured to: judge whether the language information for forming a webpage can be acquired from the client, when a judging result is no, adopt default language information as the language information for forming a webpage, when a judging result is yes, acquire the language information for forming a webpage from the client.

7. The peripheral apparatus according to claim 5, wherein, the apparatus is further configured to: send the webpage description file to the client.

8. The peripheral apparatus according to claim 5, wherein, the apparatus is further configured to:

judge whether the peripheral apparatus supports the returned language information, and when a judging result is that the returned language information cannot be supported, adopt preset default language information as the language information for forming a webpage.

9. A system for forming a webpage, comprising:

a peripheral apparatus and a client; wherein:

the peripheral apparatus acquires, from the client, language information for forming a webpage by: sending, by the peripheral apparatus, a preset executable file for acquiring language information to the client; executing, by the client, the executable file from the peripheral apparatus to acquire language information from an operating system and each of a plurality of preset software applications installed on the client, determining whether the language information from the operating system and each of the plurality of preset software applications is consistent, in response to determining that the language information from the operating system and each of the plurality of preset software applications is not consistent, obtaining a language list based on the language information from the operating system and each of the plurality of preset software applications; prompting a user to select one language from the language list; returning the language information corresponding to the selected language; and receiving, by the peripheral apparatus, the language information returned from the client, and when a webpage forming request sent by the client is received, generates a language file according to the language information and sends the language file to the client; and the client generates webpage data based on the language file and a preset webpage description file and displays a webpage formed by adopting the language information according to the webpage data.

* * * * *